UNITED STATES PATENT OFFICE.

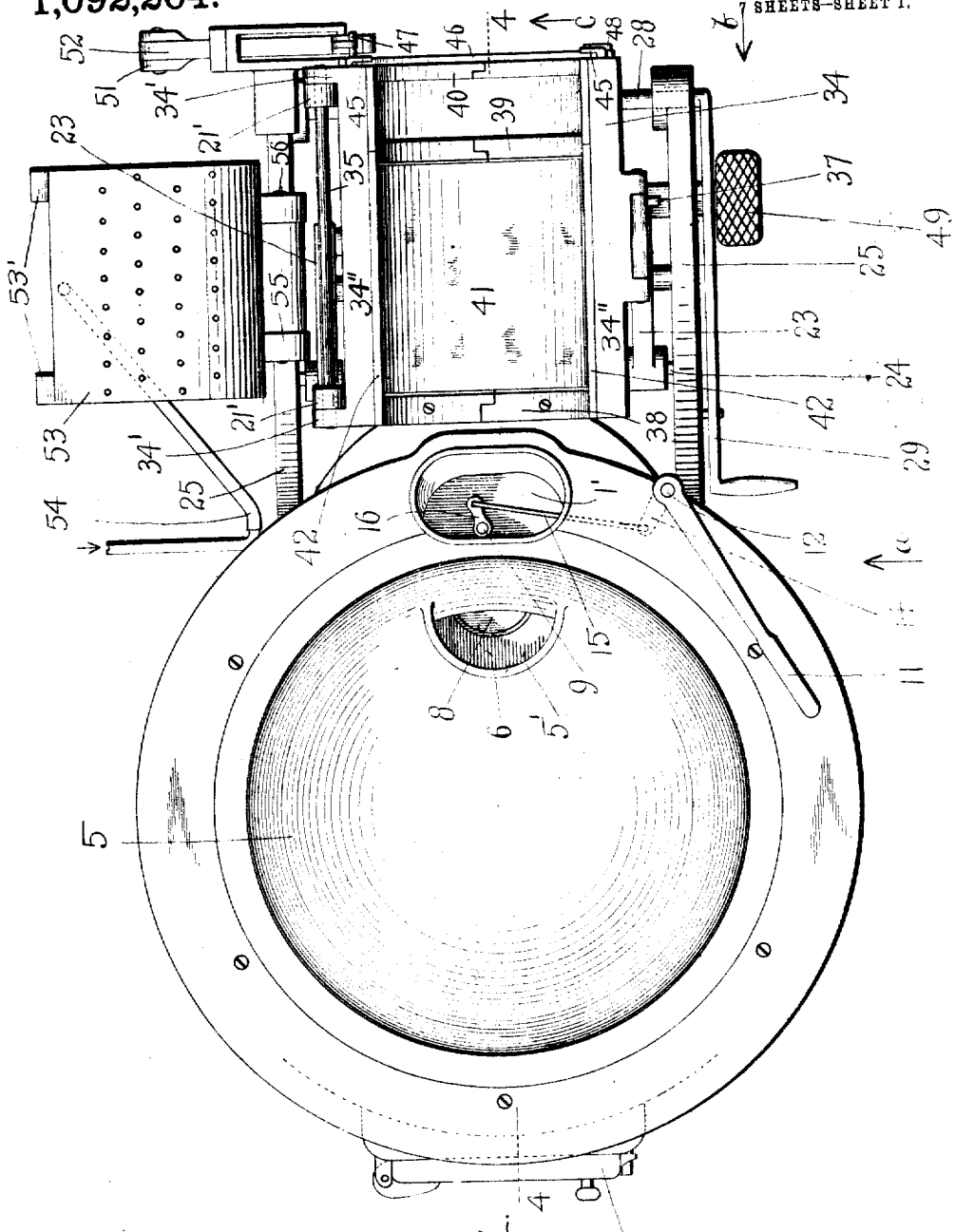

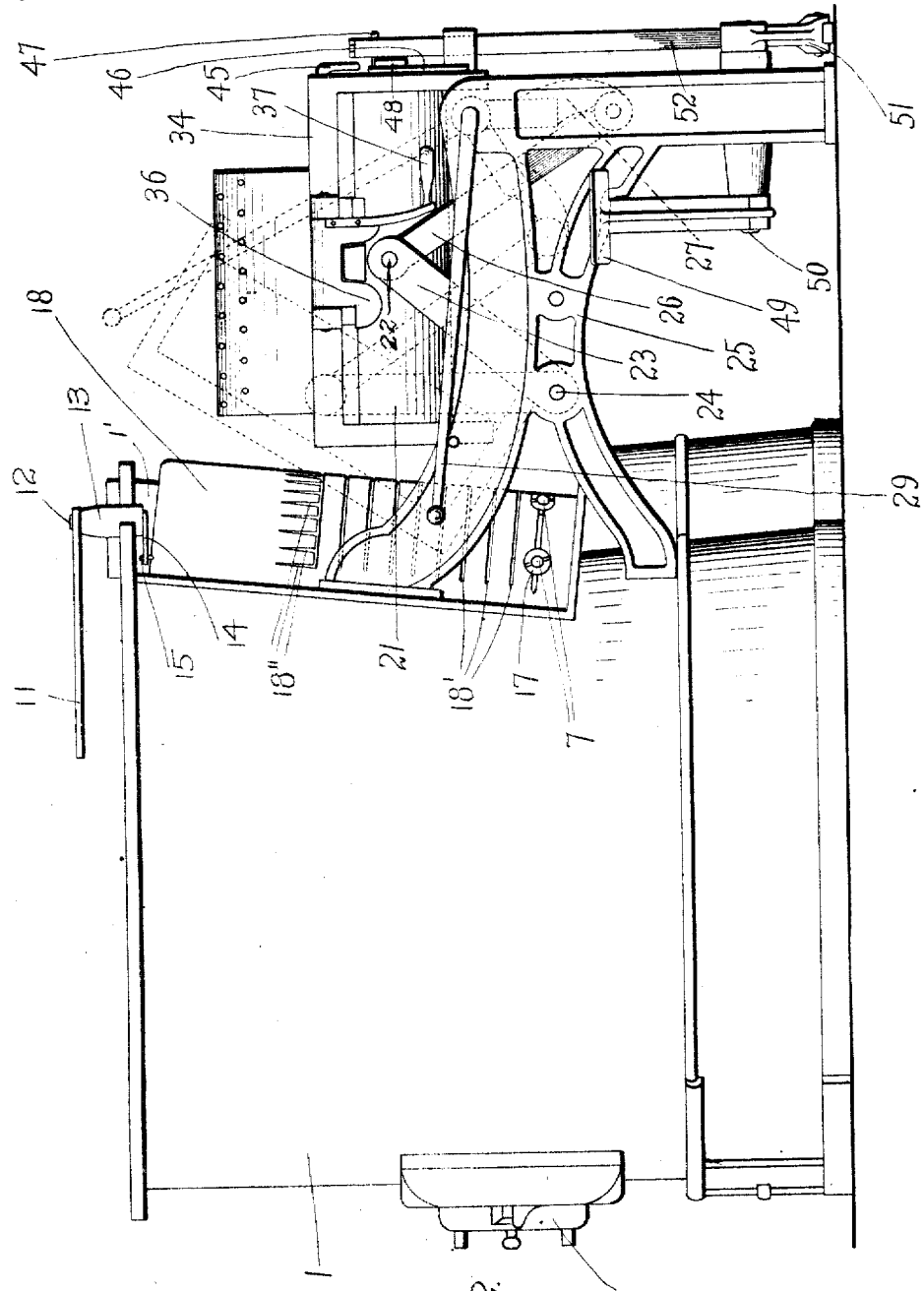

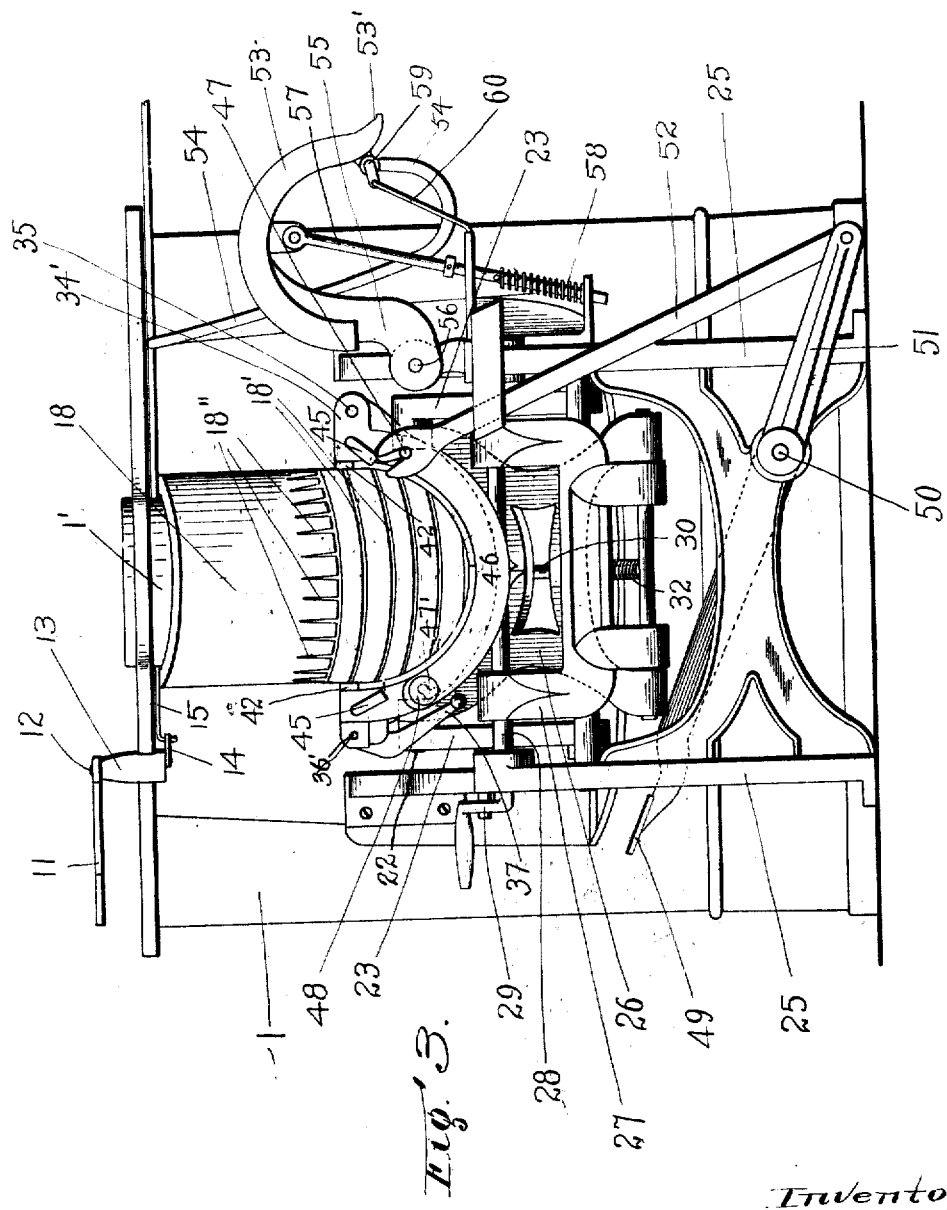

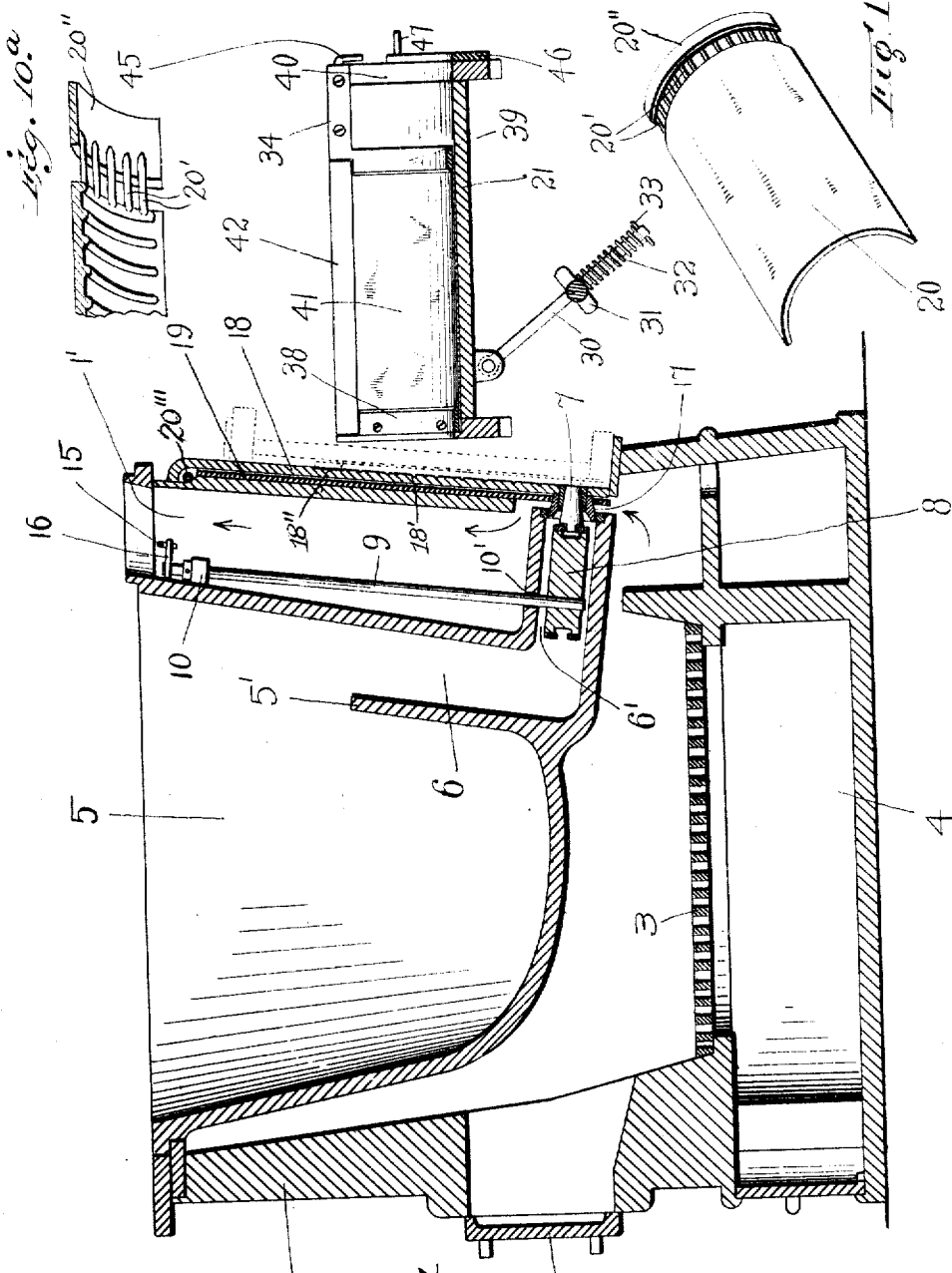

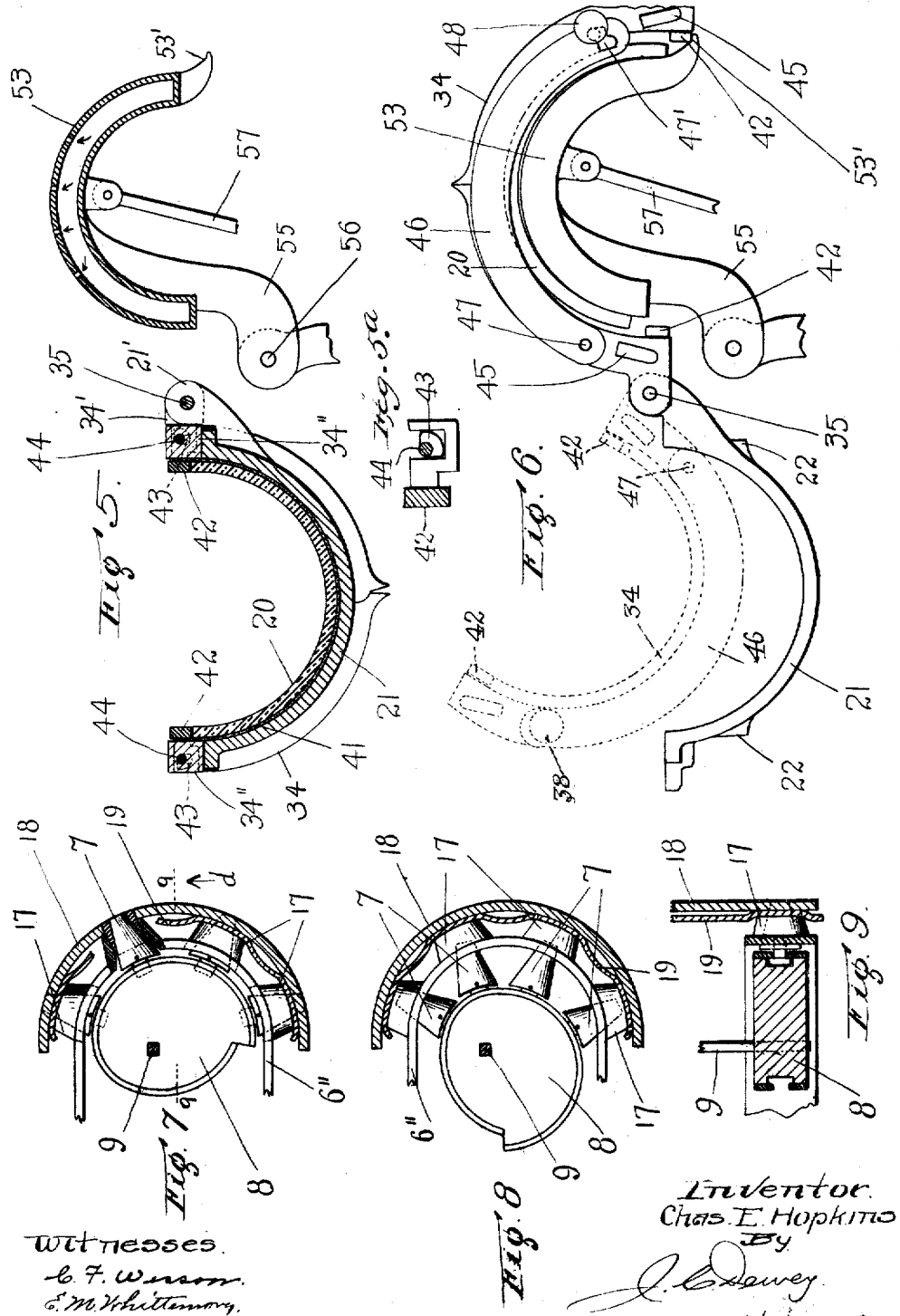

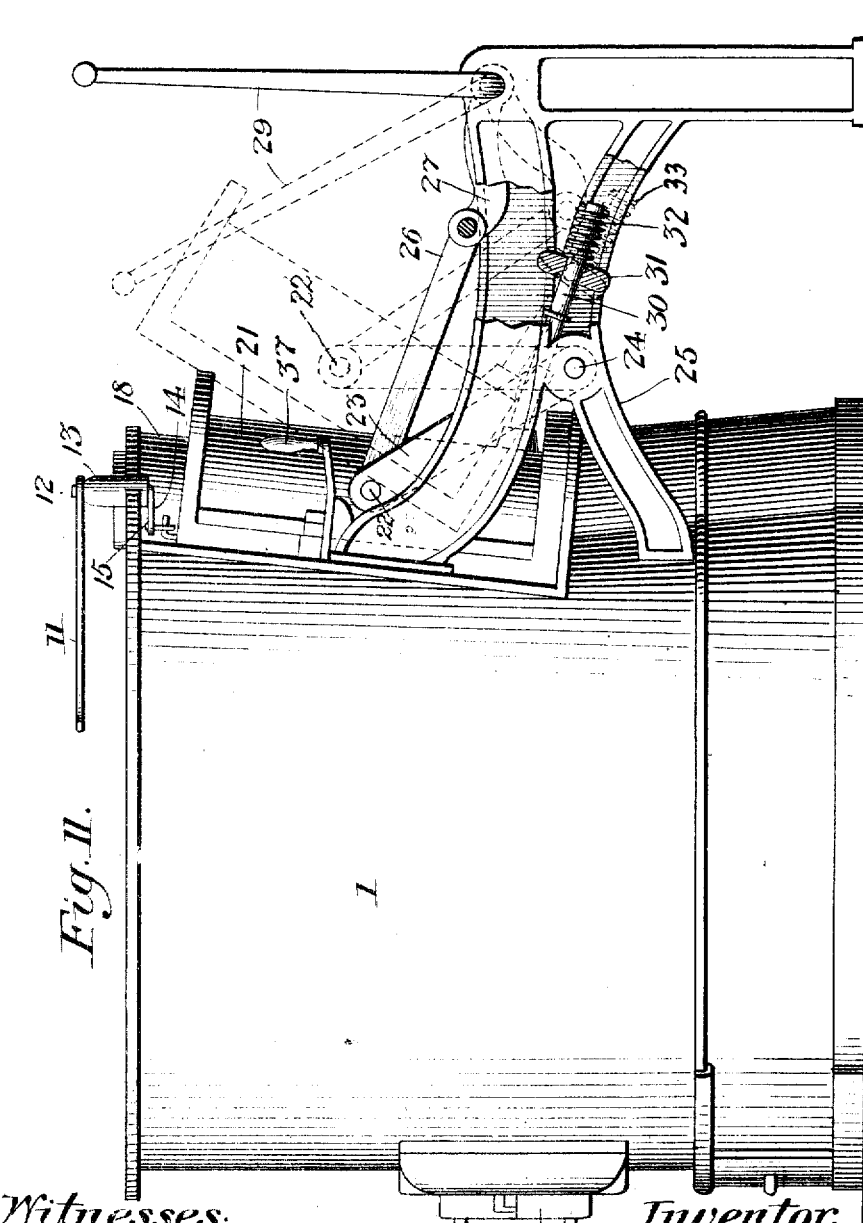

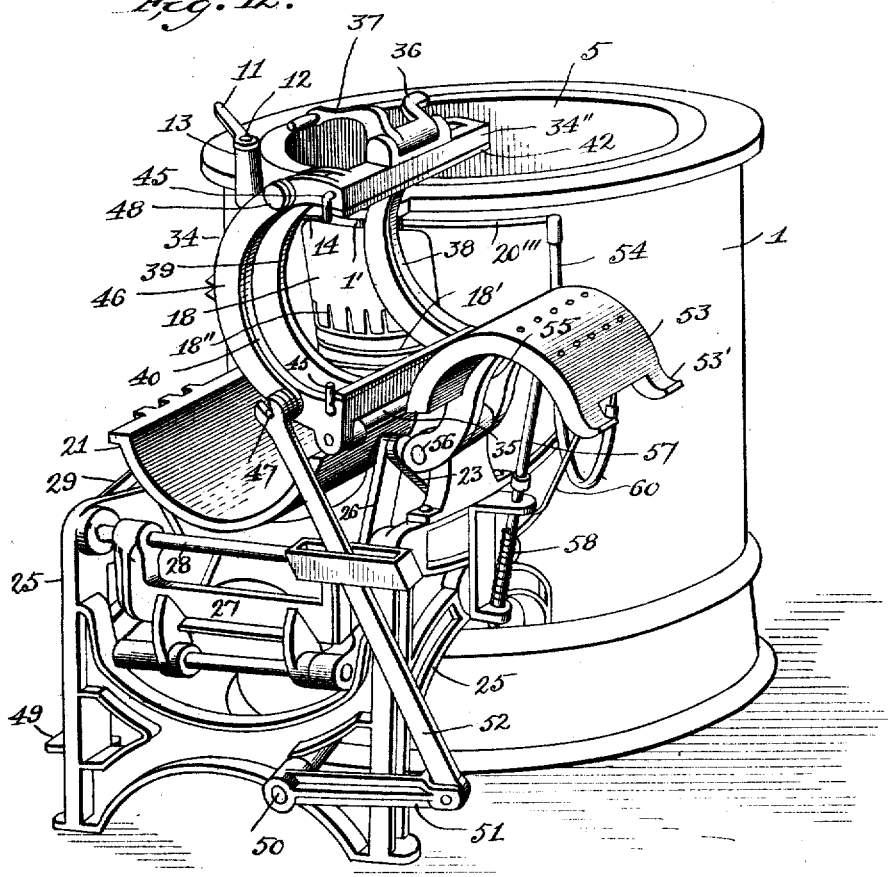

CHARLES E. HOPKINS, OF WORCESTER, MASSACHUSETTS, ASSIGNOR, BY MESNE ASSIGNMENTS, OF ONE-HALF TO F. WESEL MANUFACTURING COMPANY, OF BROOKLYN, NEW YORK, A CORPORATION OF NEW YORK.

STEREOTYPING APPARATUS.

1,092,264.     Specification of Letters Patent.     Patented Apr. 7, 1914.

Application filed September 7, 1901, Serial No. 74,707. Renewed November 3, 1913. Serial No. 799,022.

*To all whom it may concern:*

Be it known that I, CHARLES E. HOPKINS, a citizen of the United States, residing at Worcester, in the county of Worcester and State of Massachusetts, have invented certain new and useful Improvements in Stereotyping Apparatus, of which the following is a specification.

My invention relates to a stereotyping apparatus, or an apparatus for casting stereotype plates, and the object of my invention is to provide a stereotyping apparatus, consisting of a furnace, a metal pot, and one or more casting boxes, all preferably combined in one apparatus, which is of simple construction and operation, and in which the cast plate is preferably removed from the casting box in a direction at right angles to the vertical movement of the casting box.

Referring to the drawings:—Figure 1 is a plan view of my stereotyping apparatus. Fig. 2 is a side view, looking in the direction of arrow $a$, Fig. 1, and showing by broken lines a different position of some of the parts. Fig. 3 is a front end view, looking in the direction of arrow $b$, Fig. 1. Fig. 4 is a vertical section, through some of the parts, taken at a point indicated by line 4, 4, Fig. 1, looking in the direction of arrow $a$, same figure. Fig. 5 is a cross section through the casting box, and the plate holder, showing the plate in the box. Fig. 5ª is a transverse sectional view of the matrix side bar showing an elevation of the means for operating the same. Fig. 6 corresponds to Fig. 5, but shows one part of the casting box in its opposite position, and by broken lines an intermediate position; some of the parts shown in Fig. 5, for instance, the water pipe, and valve controlling the flow of water, are not shown in this figure. Fig. 7 is a detail of the valve mechanism, showing the valves closed, and one valve in section. Fig. 8 corresponds to Fig. 7, but shows the valves open. Fig. 9 is a vertical section, taken at a point indicated by line 9, 9, Fig. 7, looking in the direction of arrow $d$, same figure. Fig. 10 is a perspective view of a cast plate, with the lug attached. Fig. 10ª is a perspective view of the cast plate, partly in section to show the interior. Fig. 11 is a side view of the apparatus with parts omitted and broken away in order to show the action of the spring in controlling the lower part of the box, and Fig. 12 is a perspective view of a portion thereof.

In the accompanying drawings, 1 is the furnace or stove body, preferably of circular shape, with the door 2, grate 3, and ash chamber 4. Within the furnace 1 extends a pot 5, which holds the metal for the casting, and is preferably of circular shape, and having a division 5' therein, forming a well 6, so that the metal will flow from half way up the pot, thereby securing a more even temperature. Leading from the lower part of the well 6 is an opening 6', for the passage of metal from the pot 5. The flow of metal through the opening 6' to the casting box is controlled by one or more valves 7, in this instance four valves are shown, (see Figs. 5, and 6). The valves 7 are in this instance of cone-shaped, and dove-tailed or otherwise secured to an eccentric 8, fast on the lower end of an upright shaft 9, suitably journaled at 10, and 10', as shown in Fig. 4. The shaft 9 is operated to move the eccentric 8 to close the valves, as shown in Fig. 7, or open them, as shown in Fig. 8, by a handle 11, fast on an upright shaft 12, journaled in a bearing 13, and an arm 14 connected by a link 15 to an arm 16 fast on the shaft 9. The valves 7 are seated in cone-shaped extensions 17, forming connections between the end 6'' of the opening 6' of the well 6, and the lower end of the core 18 of the casting box, as shown in Figs. 7, and 8. The connections 17 form passages or openings for the flow of metal from the pot 5 to the casting box. The valve seats 17 are preferably made in two sections, as shown in sectional view in Fig. 7.

The valve seats 17, forming the openings for the flow of metal from the pot 5 to the casting box, are so constructed and located as to be in the line of draft from the furnace, as indicated by the arrow in Fig. 4, so that the valve seats or connections 17 will be hotter than the stereotype metal, to prevent the metal from chilling when passing through the connections 17 to the casting box. The heat and products of combustion pass between the valve seats 17, and into the convexed circular extension 1', on the furnace 1, as indicated by arrow in Fig. 4.

I will now describe the casting apparatus or mold, in this instance combined directly with the furnace and metal pot, so that the metal will flow directly into the casting box, to make the plate. The casting apparatus or mold may be used separately if preferred, and consists of the core or cope, which is stationary, and the box or drag which holds the matrix and the plate after it is cast, and is pivotally mounted on a movable support, and has a pivotal motion to be moved into an upright position contiguous to the core or cope, to receive the metal and into a horizontal position for the removal of the plate. The means for moving the box or drag into its upright position and holding it against the core or cope, and moving it into its horizontal position, consists preferably of a knuckle joint mechanism operated by a single lever. The core or cope 18 is hollowed on its inner surface, and of circular shape in cross section, corresponding to the shape of the plate to be cast, as is customary, and extends in a vertical direction around the convex circular extension 1' on the furnace 1 and is secured thereto in a fixed or stationary position. A piece of heavy sheet iron 19, (see Fig. 4), in this instance extends upon the inside of the core 18, and between it and the extension 1', and is used as a water shield or protection to said extension. The lower end of the sheet iron 19 has openings therein, through which the connections 17 extend, and the sheet iron around the openings is made to protect the connections 17, and guide the water away from the same, see Figs. 7 and 8.

A water pipe 20''', see Fig. 4, provided with perforations, extends within the upper part of the core 18, and the water passes between said core and the shield 19, and serves to keep the core 18 from becoming too hot. The core 18 has a series of horizontal grooves 18' therein, as is customary, and also a series of vertical grooves 18'', extending from the upper horizontal groove 18', as shown in Fig. 2. The grooves 18'' allow the metal, as it runs into the casting box, to form the connecting part 20', between the cast plate 20, and the slug 20'', see Fig. 10. The slug 20'' will ordinarily drop off of the plate 20 of its own weight, when the cast plate is transferred to its supporting holder or block, as will be hereinafter described.

The casting box or drag is preferably made in two parts, and so constructed and operated, that both parts have a pivotal or swinging motion in a vertical plane, to carry the matrix into position, contiguous to the core 18, for the plate to be cast, and one part, which supports the plate after it is cast, has a pivotal motion at right angles to the first mentioned pivotal motion, to raise, and transfer the cast plate onto its supporting block.

The main part 21 of the casting box, which only has one pivotal motion, has a trunnion 22 extending out from each side thereof, which act to pivotally support the drag or main part 21 on its movable support, consisting in this instance of two rocking bars or levers 23 pivotally connected at one end to the trunnions 22, and pivotally supported at the other end on a transverse rod 24 extending between the sides of the frame-work 25, in this instance secured to the furnace 1. The levers or rocking bars 23, forming the movable support, are operated by a knuckle joint mechanism, comprising the arms 26 and 27, pivotally connected, and the arm 27 fast on a shaft 28 mounted in bearings on the frame 25. The shaft 28 has an operating arm 29 fast thereon, to turn said shaft and operate the knuckle joint mechanism, to move the casting box and carry it from its horizontal position to a vertical position, when the plate is to be cast, and then return it to a horizontal position.

In connection with the casting box and its supporting mechanism, I employ a counterbalance device, consisting in this instance of a rod 30, (see Figs. 4 and 11), pivotally attached at one end the lower part of the box 21, and guided and sliding through an opening in a part 31 suitably supported, on the frame 25, and having an expansion spring 32 thereon, compressed between the stationary part 31, and a pin 33 in the end of the rod 30. Said rod 30 acts to hold away the bottom or lower end of the casting box, from the core 18, when the box is raised, until the box reaches its vertical position; it also acts to first move the bottom, or lower end of the casting box away from the bottom of the core 18, when the casting box is moved into its horizontal position, allowing the cast plate to free itself from the recesses or corrugations 18 and 18'' in the core 18. The rod 30 also acts to hold the casting box in its horizontal position. The rod 30, as is obvious from Fig. 11, causes the box to turn over as it moves forward under the toggle action. The spring 32 bearing on the rod 31, holds the bottom of the box away from the core until the box is completely turned over and is then compressed by the toggle action allowing the box to move bodily toward and into contact with the core. This action will be clearly obvious from the construction shown by full and dotted lines in Fig. 11.

In connection with the part 21 of the casting box, and forming a part of the casting box, is the matrix and plate carrying frame 34, pivoted at one edge to the part 21 by a shaft 35, which extends through lugs 21', on the part 21, and lugs 34', on the frame 34, see Fig. 1. The frame 34 has a pivotal motion with the part 21, being connected thereto by a clamp, or lock 36 pivoted to swing on a pin 36' located on the bar 34''. This clamp is operated by a handle 37, (see Figs. 2, and 3), and also a pivotal motion independent of the part 21, to raise the cast plate 20, as shown in Fig. 6, and transfer it to the plate holder, or block. The frame 34 in this instance is made of two rigid side bars 34'', and the three transverse hinged bars or rings 38, 39 and 40, see Fig. 1. The hinged or flexible bars or end rings 38 and 39 are beveled on their inner edges, and said edges support the cast plate 20, when the plate is being transferred to the supporting holder or block the portions 20 intermediate the plate 20 and the slug 20'', extend over the bar 39, and the slug 20'' extends between the bars 39 and 40. The matrix 41 extends upon the underside of the bars 38 and 39, at its edges, and its ends extend between the matrix side bars 42, extending upon the inside of the side bars 34'', and said bars 34''. The bars 42 are connected with eccentrics 43, on shafts 44, journaled in the side bars 34'', see Fig. 5. The shafts 44 are provided with handles 45, (see Fig. 1), to turn them and move out the bars 42, so the ends of the matrix can be inserted between said bars 39, and the side bars 34'', and then said bars 42 moved back to hold the matrix in place. The matrix in this way, will be firmly held in place and not removed with the cast plate.

The edges of the cast plate 20 will extend under the bars 42, which serve to hold the plate in the frame 34, when said frame is raised, or moved over, to transfer the plate on to the plate holder or block. On the outer end of the frame 34 is a rigid bar or yoke 46, pivoted at one end on a pin 47, fast in the frame 34, and provided with an offset or angular slot 47', at its other end, (see Fig. 3), through which loosely extends a headed pin 48, secured to the end of the frame 34, to attach the slotted end of the bar or yoke 46 to said frame 34. The shape of the offset slot 47' is such, that when the frame 34 is raised to transfer the plate to the block, the pin 48 will extend in one portion of said slot, as shown in Fig. 3, and in such a position, relatively to the slot 47', as to rigidly attach the end of the bar or yoke 46 to the frame 34, and thus hold the transverse hinged bars 38, 39, and 40 in a rigid position, during the raising of the frame. After the frame 34 is raised and superimposed upon the plate holding block 53, the engagement of the outer edge of the frame with the cam extensions on the block, to be hereinafter described, will cause the pin 48 to move out of one portion of the slot 47' into the other portion of said slot, as shown in Fig. 6, and allows the transverse hinged bars 38, 39, and 40 to spread or move apart, to release the cast plate, in the manner to be hereinafter described. When the frame 34 is returning to its first position, the pin 48 remains in the same portion of the slot 47', and acts to hold the transverse hinged bars 38, 39 and 40 apart, so that the outside bar 42 will not come in contact with the plate and injure it.

After the frame 34 is returned to its lowered position, the pin 48 will extend in the portion of the slot 47', first above mentioned, to hold the bars 38, 39 and 40 rigidly. The frame 34 is raised, to transfer the cast plate to the plate holder, in this instance by means of a foot treadle 49, secured on a rock shaft 50, journaled in the frame 25, through an arm 51, fast on said shaft, and a lever 52 slotted at its upper end to receive the pin 47, which is held therein when the treadle mechanism is operated, but is withdrawn when the whole casting box is moved into its vertical position.

I will now describe the plate holder, or block onto which the cast plate is transferred from the casting box, by the frame 34, above described. The plate holder or block in this instance consists of a cored casting 53, perforated on top, and connected with a water pipe, as 54, Fig. 3, through which water passes to cool the plate. The holder or block 53 is of a shape corresponding to the shape of the cast plate 20, and is preferably secured at one edge to a hinged frame 55, mounted on a shaft 56, journaled on the frame 25. The holder or block 53 is yieldingly held up in normal position in this instance by a spring actuated rod 57, having an expanding spring 58 encircling its lower end, see Fig. 3. When the cast plate 20 is transferred by the frame 34 onto the holder or block 53, the weight of the plate will depress the holder or block 53, and the cam extensions 53 on the outer edge of the holder or block 53 being engaged by the outer bar 42 of the frame 34, will cause the hinged bars 38, 39, and 40 to spread, to release the cast plate 20 from the outer bar 42, and at the same time draw the matrix 41 away from the plate, releasing the matrix and leaving the cast plate 20 on the holder 53, see Fig. 6. During the spreading of the hinged bar referred to, the slotted end of the yoke 46 falls forward and the pin 47 engaging the slot holds the hinged bars in their spread position. In this way the bar 42 will pass on the outside of the plate 20 now resting on the holder when the frame 34 is returned to its position in the box 21. I have shown a valve 59, (see Fig. 3), for automatically controlling the flow of water through the pipe 54 to the holder 53, operated by a fixed rod 60, to open the valve, when the holder is pressed down by the weight of the cast plate thereon, and to close the valve when the plate is removed, and the holder 53 rises.

From the above description in connection with the drawings, the operation of my apparatus for making stereotype plates will be readily understood by those skilled in the art, and briefly is as follows: After the metal placed in the pot 5 is sufficiently melted by the heat from the furnace, the apparatus is ready to be used. The casting box 21 is in a horizontal position, as shown in Fig. 1. The two bars 42 are moved out by means of the handles 45, as above described, so that the ends of the matrix can be inserted between said bars 42 and the rigid side bars 34'', and then said bars 42 are moved back to bind or hold the ends of the matrix between the bars 42 and the bars 34'', as shown in Fig. 5. The end rings 38 and 39 rest upon the flat margins of a flexible matrix, and force the same into proper curvature against the bottom, the edges adjacent to the type or impression face being slightly beveled under so as to overlap the usual raised margins formed between the impression face of the matrix and the flat margins. This beveling, for the purpose of overlapping the said raised part of the margins, is plainly shown in Fig. 4. Above this under cutting of the curved bars 38 and 39 the bars are beveled the reverse way, so as to form beveled edges upon the plate, thereby forming means by which they can be attached to a cylinder of a printing press without the usual cutting. By this combination of overlapping the raised portion of the margins of a matrix, and forming the bevel, I am enabled to dispense with the usual hand trimming, and the same beveled edges which form beveled edges upon the plate, also serve as supports upon which the plate rests as the frame is raised and swings over to deposit the plate upon the plate holder. By means of the arm or handle 29, the knuckle joint mechanism is operated to raise the casting box, carrying the matrix 41, from a horizontal position into a vertical position, and contiguous to the core 18, preparatory to the plate being cast. The valves 7 are now opened by the revolution of the eccentric 8 by the handle 11, through intermediate connections, to allow the metal to flow from the well 6 through the opening 6', and through the connections 17, and up between the core 18, and the matrix 41, to occupy the space in the casting box between the bars 42, 42, 38, and 39, with the slug between the bars 39 and 40. Water is turned on to flow through the pipe 20, between the sheet iron 19, and the core 18.

After a sufficient quantity of metal has passed through the valves, the valves are closed by turning the eccentric 8 in the opposite direction. The casting box is then moved back into its horizontal position, and the frame 34 disconnected from the main part 21 of the casting box, and raised by the treadle mechanism, to transfer the cast plate from the casting box onto the holder or block 51. The weight of the plate depresses the holder 53, and as above described, the plate is released, the matrix 41 remaining in place, and the frame 34 is returned to its normal position in the casting box, ready for another casting. Water is turned on from the pipe connection 54 to the holder 53, to cool the cast plate, preparatory to removal.

It will be understood, that the details of construction of my improvements in stereotyping machines may be varied if desired. More than one casting box may be used if desired, and the casting apparatus or mold may be used separately and independently of the furnace, and melting pot if desired.

Having thus described my invention, what I claim as new, and desire to secure by Letters Patent is:—

1. In a stereotyping apparatus, the combination with a furnace, and a casting box, of a stationary hollow core attached to the frame of the furnace, and extending in a vertical position, and having an opening or openings leading therethrough, for the flow of metal into the casting box.

2. In a stereotyping apparatus, the combination with a melting pot, a casting box, and a stationary core, with openings through the lower part thereof for the passage of metal to the casting box, of means for controlling the flow of metal, consisting of one or more valves of cone shape, working in cone shaped extensions which form connections between the end of the opening in the melting pot and the lower end of the core.

3. In a stereotyping apparatus, the combination with a furnace, a melting pot, a casting box, and a stationary core attached to the furnace and having an opening or openings through the lower part thereof for the passage of metal from the melting pot, of a cone shaped connection or connections extending in said opening or openings, and located in the line of draft from the furnace.

4. In a stereotyping apparatus, the combination with a furnace, a melting pot, and a casting box, of a stationary core attached to the furnace and extending in a vertical direction and having openings through its lower end, and connections in said openings forming passages for the flow of metal by gravity from the melting pot to the casting box.

5. In a stereotyping apparatus, the combination with a furnace, a melting pot, and a casting box, of a stationary convexed shaped core attached to the furnace and extending in a vertical direction, and having openings through its lower end, and connections leading from said openings to the melting pot, and forming valve seats, and a water shield, extending inside of the convexed core and having openings through its lower part, through which said connections extend, to guide the water, which passes between said core and shield, away from said connections and prevent the cooling of the same.

6. In a stereotyping apparatus, the combination with a furnace, a stationary core attached thereto and extending in a vertical direction, and a melting pot, of a concaved casting box or frame pivotally mounted and having a movement in a vertical plane, and means for moving said box or frame, and a concaved matrix and plate carrying frame pivotally mounted on said box or frame, and consisting of two parallel rigid side bars, and transverse bars hinged or jointed at their centers, and rigidly attached at their ends to said side bars, two of said transverse bars being beveled on their inner edges, which edges support the cast plate when said plate is being transferred to the plate holder or block.

7. In a stereotyping apparatus, the combination with a furnace, a stationary core attached to the furnace and extending in a vertical direction, and a melting pot, of a casting box comprising a concaved bottom or box, and a concaved rectangular frame, both pivotally supported and adapted to be moved into a vertical plane contiguous to the core, and said rectangular frame having parallel side bars, and movable bars connected with eccentrics on a revolving shaft journaled in said side bars, and means for turning the shaft to move the bars away from the inner edges of said side bars, so that the ends of the matrix may be inserted between said side bars and said movable bars, and clamped in position by moving the movable bars toward said side bars.

8. In a stereotyping apparatus, the combination with a furnace, and a melting pot, and a core extending in a vertical direction upon an extension on the furnace, of a casting box, pivotally supported, and adapted to be moved in a vertical plane contiguous to the core, and a spring controlled rod connected with the casting box to hold one end thereof away from the core, as the casting box is moved into position for casting the plate, and to move one end of the casting box away from the core, after the plate is cast, and when the casting box is returned to its first position.

9. In a stereotyping apparatus, the combination with a furnace, a melting pot, and a convexed hollow core attached to and extending in a vertical direction upon an extension on the furnace, of a casting box pivotally supported and adapted to be moved into a vertical position contiguous to the core, to receive through the core the metal from the melting pot, and means for moving said casting box into a vertical position to receive the metal, and into a horizontal position after the plate is cast.

10. In a stereotyping apparatus, the combination with a furnace, a melting pot, and a core attached to and extending in a vertical direction upon an extension on the furnace, of a casting box comprising two parts, both parts having a pivotal motion in a vertical plane to be moved into a position contiguous to the stationary core, to receive the metal for the cast plate, and to be returned to their normal horizontal position, and one part, supporting and holding the matrix and the plate after it is cast, having an independent pivotal motion at right angles to the pivotal motion of both parts, and means for moving both parts together, and one part separately.

11. In a stereotyping apparatus, the combination with a furnace, a melting pot, and a stationary core extending in a vertical direction, and attached to an extension on the furnace, of a casting box made in two parts, both parts having a pivotal motion in a vertical plane, and one part, which supports the matrix and the cast plate, having an independent pivotal motion at right angles to the pivotal motion of both parts, to transfer the cast plate onto the plate holder.

12. In a stereotyping apparatus, the combination with a furnace, a melting pot, and a stationary core extending in a vertical direction and attached to the furnace, of a casting box made in two parts and pivotally supported, and adapted to be moved in a vertical plane contiguous to the core, to receive the cast plate, and one part comprising two rigid parallel longitudinal side bars, and three concaved transverse bars hinged or jointed at their centers, and rigidly attached at their ends to the side bars, two of said transverse bars having their edges beveled to support the cast plate as it is transferred onto the plate holder.

13. In a stereotyping apparatus, the combination with a furnace, and a pot for the metal, having an opening or openings, leading out from the lower part thereof for the flow of metal by gravity, and means for controlling the flow of metal from the pot, said opening or openings extending through the lower part of the stationary core, of said core extending in a vertical direction around an extension on the furnace, and a casting box, holding the matrix, and having a pivotal or swinging motion in a vertical plane, to carry the matrix into position contiguous to the core, to receive the metal for the plate between the core and the matrix, at the lower end of the core.

14. In a stereotyping apparatus, the combination with a furnace and the melting pot, of a plate holder or block yieldingly supported, a casting box comprising the main frame, and a secondary frame, pivotally mounted on the main frame, and means for moving said secondary frame to transfer the cast plate, in a direction at right angles to the movement of the main frame, onto the plate holder or block.

15. In a stereotyping apparatus, the combination with a furnace, a melting pot, and a core attached to and extending in a vertical direction on the furnace, of a casting box made in two parts, one a concaved bottom, and the other a rectangular frame comprising two parallel side bars, and transverse bars hinged or jointed at their centers and rigidly secured at their ends to said side bars, and a rigid bar on the outer end of the rectangular frame, pivotally attached thereto at one end, and adjustable at its other end, relative to the frame, by means of a pin extending through an offset slot in said bar, to allow of the moving of the hinged bars.

16. In a stereotyping apparatus, the combination with a core and a casting box, consisting of a main frame or bottom, and a matrix and cast plate carrying frame adapted to have a pivotal motion at right angles to the pivotal motion of the main frame, to transfer the cast plate to the plate holder or block, of said plate holder or block pivotally mounted and having inclined or cam extensions on its outer edge, to be engaged by the matrix and cast plate supporting frame, on the transferring of the plate, the said block being cored or made hollow, and perforated and connected with a water pipe, and said water pipe, and a valve for automatically controlling the flow of water through the pipe into the block.

17. In a stereotyping apparatus, the combination with a furnace, a melting pot, and a stationary core attached to the furnace, of a casting box made in two parts, one the main frame or bottom, and the other a rectangular frame, for holding the matrix and transferring the cast plate, and pivotally attached at one edge, and comprising two rigid side bars, and transverse bars hinged or jointed at their centers, and a plate holder or support pivotally supported and adapted to receive the plate from the rectangular frame, the weight of the plate lowering the plate holder and causing the hinged bars of the rectangular frame to release the plate, and at the same time to draw the matrix away at its edges from the plate, said matrix being held in the frame and returned with the frame to its first position.

18. In a stereotyping apparatus for casting curved plates, the combination with a melting pot, a furnace, and a stationary convexed core extending in a vertical direction upon and secured to said furnace, said core having a series of horizontal grooves therein, also a series of vertical grooves extending from the upper horizontal groove, of a concaved casting box frame and a concaved casting box, having a pivotal motion to bring it into a position contiguous to the core, and to move it away from the core.

19. In a stereotyping apparatus for casting curved plates, the combination with a melting pot, a furnace, and a stationary convexed core extending upon and secured to said furnace, said core having a series of horizontal grooves therein, also a series of vertical grooves extending from the upper horizontal groove, of a casting box frame, and a casting box having a pivotal motion to bring it into a position contiguous to the core and to move it away from the core, said casting box made in two parts, one part having an independent pivotal motion to transfer the cast plate onto a plate supporting block or holder.

20. In a stereotyping apparatus for casting curved plates, the combination with a melting pot, a furnace having a circular extension thereon, and a core extending upon and secured to said extension, of a casting box frame attached to the furnace, and a casting box having a pivotal motion to bring it into position, contiguous to the core, and to move it away from the core, and a part of the casting box having an independent pivotal motion, to transfer the cast plate onto a plate supporting block or holder, and said plate holder yieldingly supported, and provided with inclined or cam extensions on one edge, to engage one edge of that part of the casting box which has an independent pivotal motion, to cause the same to release the plate carried by said part, and free it from the matrix secured in said part.

21. In a casting mold, the combination with a stationary upright core or cope, and a box or drag pivotally supported and adapted to be moved into an upright position contiguous to said cope, of a spring controlled rod connected with the box or drag to hold one end thereof away from the core, as said box is being moved into an upright position, and to move said end of the box or drag away from the core as the box or drag is being moved into a horizontal position.

22. In a stereotyping apparatus, a melting pot, an upright cope, and a casting box supported in front of the cope, the space between forming a casting chamber, when the casting box is moved toward the cope, a hand-operated lever for moving the casting box toward or away from the cope, means for conveying molten metal from the pot into the casting chamber, and a pivotally supported lever for operating the said means independent of the casting box operating means, and matrix holding means attached to the casting box, with means by which a matrix held therein can be opened out sufficiently to separate the matrix from a plate cast in the said casting chamber.

23. In a curved stereotype plate casting apparatus, a melting pot, an upright cope, and a casting box supported by a framing in front of the cope, the space between forming a curved casting chamber when the casting box is moved toward the cope, a shaft pivotally supported in the said framing, to which are solidly attached link arms which are in turn connected to link arms attached to the drag, a hand lever for operating the said shaft so as to move the casting box toward or away from the cope, means independent of the operating means for moving the casting box for supplying metal to the casting chamber, and means for separating the matrix from the plate.

24. In a curved stereotype plate casting apparatus, having a cope mounted in an upright position, and a casting box supported by a framing in front of the cope so as to form a curved casting chamber when the casting box is moved up to the cope, a shaft pivotally supported in the said framing, and arms having one end solidly attached to the said shaft, and the other end of said arms pivotally attached to the casting box, means for supporting a flexible matrix in the casting chamber, and means attached to the casting box for opening out the matrix supporting means so as to allow of the matrix being separated from the curved plate.

25. In a stereotyping apparatus, a cope, and a casting box, means for turning the casting box from a horizontal position into a substantially vertical position to receive a charge of metal in a casting chamber formed between the said cope and casting box, with means for separating, by opening out and drawing away, a flexible matrix held by the casting box.

26. In an upright curved stereotype plate casting apparatus, a convex core, a concaved casting box positioned so as to form a convex-concave casting chamber, matrix clamps pivoted to the casting box, there being a space above the type face of the matrix in the casting chamber to form a riser, a concave flexible bar arranged in the riser space so as to overlap the upper edge of a flexible matrix held in the clamps, an opening for supplying metal to the chamber, means for moving the clamps and band so as to separate the matrix and band from a plate cast in the chamber, and means for delivering the plate free from the casting members.

27. In a stereotype plate casting apparatus, a melting pot, an upright cope or cylinder mounted thereon, a concaved casting box supported in front of the cope or cylinder, the space between forming a curved casting chamber when the casting box is moved toward the cylinder, means for moving the casting box toward or away from the cylinder, means for conveying molten metal from the pot into the casting chamber, and a hand lever for operating said means.

28. In an upright curved stereotype plate casting apparatus, in combination, a melting pot and furnace of a casting mechanism, comprising an upright core and casting box, the space between them forming a casting chamber, matrix clamps pivoted to the casting box, a concaved band or bar co-acting with said clamps and arranged to overlap the upper edge of a flexible matrix held in said clamps, means for supplying metal from the pot to the casting chamber, means for operating the supplying means, means for moving the casting box away from the core, means for separating the flexible matrix and band from a plate cast in the casting chamber, a plate holder, and means co-acting with the casting box, to move the plate from the core to the plate holder.

29. In a curved stereotype plate casting apparatus, an upright core and a casting box, the annular space between the two forming a casting chamber, a plate holder separate from the box, and means attached to the casting box for moving a plate away from the core to the plate holder.

30. In an upright stereotype apparatus, a core, and a casting box having space between them forming a casting chamber, a plate holder separate from the box, and means operated by the casting box to separate a plate cast in the chamber from the core, and deliver it on said plate holder.

31. In a curved stereotype casting apparatus, a cylindrical core, and a concaved casting box, positioned to form a curved casting chamber between the core and casting box, and a plate holder, and means for supplying metal to the casting chamber, and means for opening and closing the casting chamber, and means, operatively connected to the box for separating a plate cast in the casting chamber, from both the casting box and the core, and transferring it to the plate holder.

32. In a curved stereotype casting apparatus, a core, and a casting box, having a plate carrying frame pivotally attached, and arranged so as to deliver a plate cast in a chamber formed between the said core and casting box, free from both the core and casting box.

33. In a stereotype apparatus, a core, a casting box, the space between forming a curved casting chamber, a plate carrying frame for supporting and carrying the cast plate, and a plate holder, means for separating the core and box, to open the casting chamber, and means for moving the plate carrying frame to deliver the plate to the plate holder.

34. In a stereotype apparatus, a convex core, and concaved box, supported in a frame, so as to form an upright curved casting chamber, means for separating the core and box to free a plate cast in said chamber, and means to deliver the said plate from the core in a horizontal position with its straight edges extending downward.

35. In a stereotype casting apparatus, a core, and casting box, supported in a frame, so as to form an upright curved casting chamber, means for separating the core and casting box, and means for carrying a plate cast in the chamber out of said chamber and away from said core and to turn the plate so that its straight edges are down.

36. In a stereotype apparatus, a core, a casting box having matrix clamps, and a plate holder, means for separating the core and box to deliver a plate cast in a chamber formed between the said core and box, means for moving the matrix clamps so as to free a matrix held therein from the plate, and means for delivering the plate to the plate holder with its straight edges down.

37. In a stereotype plate casting apparatus, a core and a box forming a vertical casting chamber, a horizontal support, and means for delivering a plate cast in the chamber to the support, with its type face up.

38. In a stereotype plate casting apparatus, a core and a casting box, positioned so as to form a casting chamber between said core and box, a plate cooler, means for moving a plate cast in the casting chamber to the cooler, and means for supplying water to the said cooler.

39. In a curved stereotype apparatus, the combination with a casting mechanism, of a cooling mechanism, means for conveying a stereotype plate out of the casting mechanism to the cooling mechanism, and means for cooling said stereotype plate.

40. In a stereotype making machine, a cooling apparatus for cooling a plate after it has been removed from a casting chamber, and means for conveying the plate from the stereotype making machine to the cooling apparatus.

41. In a stereotype plate making machine, the combination with a frame, of a casting device mounted thereon, a cooling device mounted on said frame adjacent to the casting apparatus, and means on the frame for conveying the plate from the casting apparatus to the cooling device.

42. In a stereotype plate making machine the combination with a casting chamber, of a cooling device and means for transferring the cast plates from the casting chamber to the cooling device.

43. In a stereotype plate making apparatus the combination with the casting device comprising a stationary element against which the plates are cast, means for removing a plate from the casting device and from said stationary element and a cooling device for receiving the plates from said removing means.

44. In a stereotype plate making apparatus, the combination with a casting device for stereotype plates, of a cooling device, having means for automatically turning on a cooling fluid to cool a plate when a plate is deposited thereon and means for transferring a plate from the casting device to said cooling device.

CHARLES E. HOPKINS.

Witnesses:
J. C. Dewey,
M. Haas.

Correction in Letters Patent No. 1,092,264.

It is hereby certified that Letters Patent No. 1,092,264, granted April 7, 1914 upon the application of Charles E. Hopkins, of Worcester, Massachusetts, for an improvement in "Stereotyping Apparatus," was erroneously issued to said Hopkins and F. Wesel Manufacturing Company, whereas said Letters Patent should have been issued to the inventor, *said Hopkins* as owner of the entire interest in said invention as shown by the record of assignments in this office; and that the said Letters Patent should be read with this correction therein that the same may conform to the record of the case in the Patent Office.

Signed and sealed this 28th day of April, A. D., 1914.

[SEAL.]

J. T. NEWTON,
*Acting Commissioner of Patents.*